United States Patent [19]

Oh et al.

[11] Patent Number: 4,914,560
[45] Date of Patent: Apr. 3, 1990

[54] PROTECTION CIRCUIT FOR SWITCHING MODE POWER SUPPLY CIRCUIT

[75] Inventors: Yong H. Oh, Daeku; Seong Han, Kyungsangbook-Do, both of Rep. of Korea

[73] Assignee: Goldstar Co., Ltd., Seoul, Rep. of Korea

[21] Appl. No.: 277,786

[22] Filed: Nov. 30, 1988

[30] Foreign Application Priority Data

Nov. 30, 1987 [KR] Rep. of Korea ............... 20941

[51] Int. Cl.⁴ .......................................... H02M 13/335
[52] U.S. Cl. ........................................ 363/56; 363/19; 363/97
[58] Field of Search ......................... 363/18–21, 363/56, 97, 89; 323/902, 267

[56] References Cited

U.S. PATENT DOCUMENTS

| | | | |
|---|---|---|---|
| 4,443,838 | 4/1984 | Yamada | 363/19 |
| 4,595,977 | 6/1986 | von der Ohe | 363/56 |
| 4,649,464 | 3/1987 | Shono | 363/97 |
| 4,763,235 | 8/1988 | Morita | 363/97 |
| 4,763,236 | 8/1988 | Usui | 363/97 |

*Primary Examiner*—Peter S. Wong

[57] ABSTRACT

A protection circuit for a switching mode power supply circuit which outputs a constant voltage interrupts the ON-OFF switching operation of the switching transistor when an overvoltage state is detected. This protection circuit includes a switching transistor, a diode, a phototransistor, a thyristor, and a capacitor, in conjunction with a photodiode, a zener diode and a thyristor. If either an overvoltage is detected or an overcurrent is detected due to the load circuit being short circuited, the protection circuit simultaneously prevent the power supply input from the power input line from being unnecessarily lost.

2 Claims, 3 Drawing Sheets

PROTECTION CIRCUIT FOR SWITCHING MODE POWER SUPPLY CIRCUIT

BACKGROUND OF THE INVENTION

1. Field of the Invention

The present invention relates to a switching mode power supply circuit (SMPS) using repetitive switching of the states which ON and OFF of a transistor to cause a direct current being applied to a primary coil of transformer to induce a current into a secondary coil, and more particularly, to a protection circuit for a switching mode power supply circuit using the ON and OFF operation of a transistor to allow an interruption when an over voltage is outputted.

2. Discussion of the Prior Art

As shown in FIG. 1, a protection circuit for a switching mode power supply circuit is constructed such that a power input terminal $V_{IN}$ is connected to a collector of a transistor $TR_1$ switching ON and OFF a current flowing through a primary coil $T_{11}$ of a transformer $T_1$; an emitter of the transistor $TR_1$ is connected to an intermediate terminal of a secondary coil $T_{12}$ of transformer $T_1$; the end terminal of the secondary coil $T_{12}$ are connected to a base of the transistor $TR_1$ through a resistor $R_{14}$, a capacitor $C_1$ and a feed back circuit 1; secondary coils $T_{13}$ $T_{14}$ are, respectively, connected to each input terminal of a rectifier 2 which is composed of a diode $D_1$, capacitors $C_2$ $C_3$ and a coil $L_1$ and another rectifier 3 which is composed of a diode $D_2$, capacitors $C_4$ $C_5$ and a regulator REG. On the other hand, an output terminal of the rectifier 2 is connected to a zenor diode $ZD_1$ and a resistor $R_2$ through a resistor $R_1$. Resistor $R_1$ is also connected to an emitter of the transistor $TR_2$ through the resistor $R_3$ and to an inversion input terminal (−) of a comparator COMP through a resistor $R_4$. The output terminal of rectifier 2 is also connected to a resistor $R_6$ and to a non-inversion input terminal (+) of the comparator COMP through a resistor $R_5$. The output terminal of comparator COMP is connected to a base of the transistor $TR_2$ through a resistor $R_8$. A collector of transistor $TR_2$ is connected to a base of a transistor $TR_3$ through a resistor $R_{10}$. An emitter of the transistor $TR_3$ is connected to a gate of a thyristor $SCR_1$ and a capacitor $C_6$ through a resistor $R_{13}$. An anode of thyristor $SCR_1$ is connected the diode $D_1$, capacitor $C_2$, and coil $L_1$.

The operation of the conventional circuit will be explained below.

When a direct current is inputted to a power input terminal $V_{IN}$, the direct current power is applied to a primary coil $T_{11}$ of transformer $T_1$, thereby inducing a current in the secondary coils $T_{12}$ and $T_{13}$ in accordance with the ON and OFF switching of the transistor $TR_1$. The power induced in a secondary coil $T_{12}$ is applied to a base of transistor $TR_1$ through the feed back circuit 1, thereby causing the ON and OFF switching of the transistor $TR_1$ to be repeated.

At this moment, the power is induced in another secondary coil $T_{13}$ and is rectified via the rectifier 2 which outputs a constant voltage $V_1$. At the same time, the outputted constant voltage $V_1$ is applied to a zenor diode $ZD_1$ through a resistor $R_1$ to becomes another constant voltage. It is then applied to an inversion input terminal (−) of the comparator COMP through a resistor $R_4$. Further, the power is induced in to another secondary coil $T_{14}$ is rectified via the rectifier 3 which outputs a constant voltage $V_2$ the output voltage $V_2$ is applied to a non-inversion terminal (+) of the comparator COMP through a resistor $R_5$.

If the voltage which applied to the inversion input terminal (−) of the comparator COMP is lower than the voltage of non-inversion input terminal (+) of the comparator COMP, a high potential signal is outputted from the comparator COMP and the transistor $TR_2$ is turned OFF, accordingly the transistor $TR_3$ also turns OFF. In response to this OFF state, the gate of the thyristor $SCR_1$ is applied with a low potential, and the thyristor $SCR_1$ is turned OFF, thereby causing the rectifier to execute normal operations.

If the voltage applied to the inversion input terminal (−) of the comparator COMP is higher than the voltage applied to the non-inversion input terminal (+) of the comparator COMP, a low potential signal is outputted from the comparator COMP, and in contrary with above description, the transistor $TR_2$ turns ON causing the transistor $TR_3$ to also turn ON. A high potential signal is outputted to its emitter. This high potential signal is applied to the gate of the thyristor $SCR_1$ thereby causing the thyristor $SCR_1$ to become conductive and rendering the operation of the rectifier 2 to be terminated.

However, in such a conventional protection circuit for switching mode power circuit, if an overvoltage is outputted from the rectifier 2, the switching transistor $TR_1$ continuously repeats switching ON and OFF; therefore, the direct current power input to the power input terminal $V_{IN}$ is unnecessarily lost such that the, switching mode power supply circuit cannot be protected.

SUMMARY OF THE INVENTION

Therefore, an object of the present invention is to provide a protection circuit for a switching mode power supply circuit which protects the switching mode power supply circuit from an overvoltage condition.

The object of the present invention, as described above, is realized in such a manner when an overvoltage is outputted from the switching mode power supply circuit, the first constant voltage is terminated by interrupting the ON.OFF switching operation of the switching transistor.

DETAILED DESCRIPTION OF THE INVENTION

Figure 1:
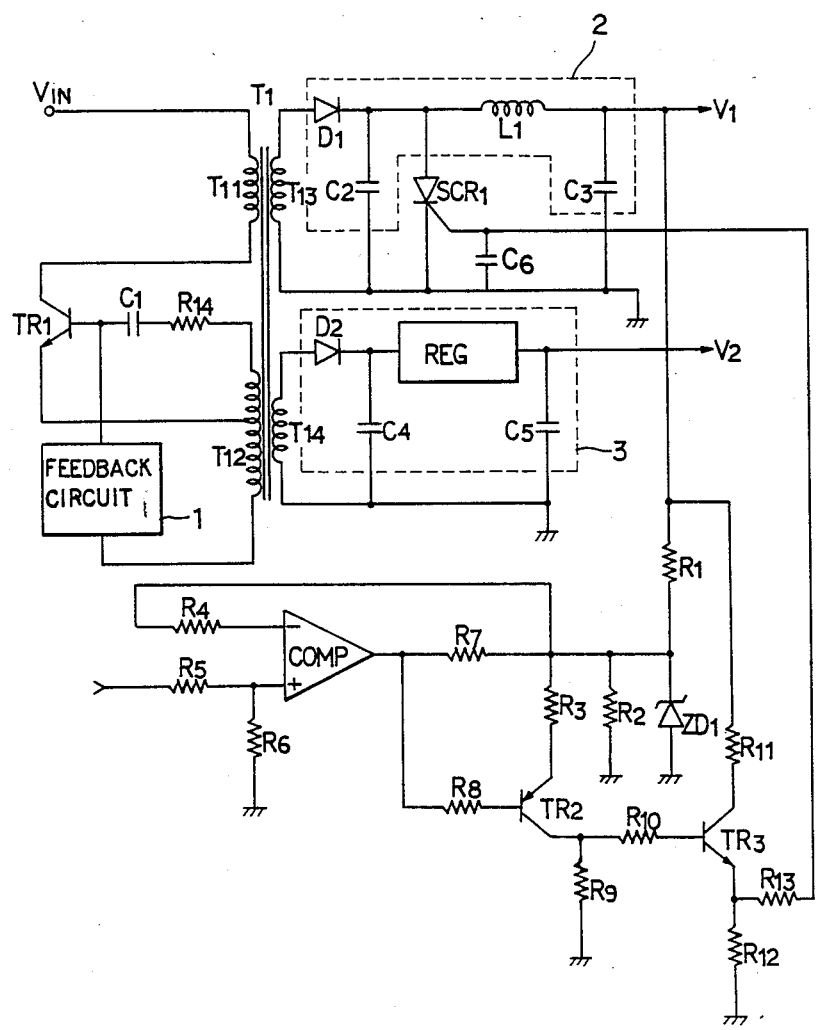
FIG. 1 is a circuit diagram of a conventional protection circuit for a switching mode power supply circuit.
Figure 2:
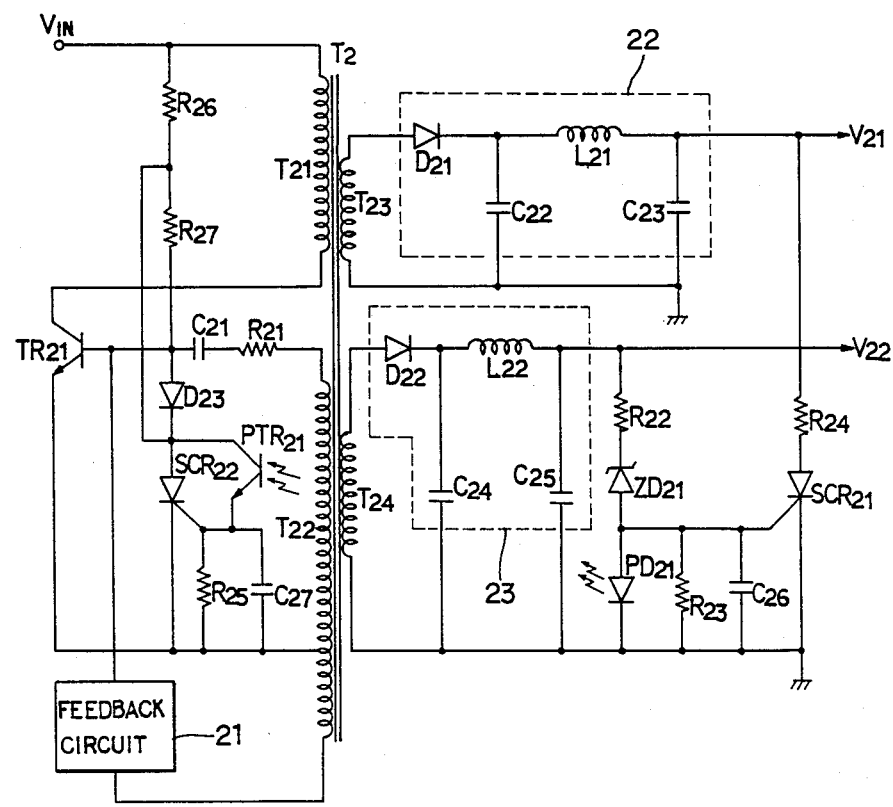
FIG. 2 is a circuit diagram of a protection circuit for a switching mode power supply circuit according to an embodiment of the present invention.

Referring to FIG. 2, a switching mode power supply circuit is constructed such that a power input terminal $V_{IN}$ is connected to a collector of a switching transistor $TR_{21}$ through a primary coil $T_{21}$ of a transformer $T_2$. An emitter of the transistor $TR_{21}$ is connected to an intermediate terminal of a secondary coil $T_{22}$ and one end terminal. The other end terminal of the secondary coil $T_{22}$ are connected to a base of the transistor $TR_{21}$ through a resistor $R_{21}$, a capacitor $C_{21}$, and a feed back circuit 221. The secondary coils $T_{23}$ and $T_{24}$ of the transformer $T_2$ are connected, respectively, to each of the input terminals of rectifiers 22 and 23 so that constant voltages $V_{21}$ and $V_{22}$ are outputted.

The output terminal of the rectifier 23 is connected in common to a photodiode $PD_{21}$, a resistor $R_{23}$, a capacitor $C_{26}$, a gate of a thyristor $SCR_{21}$ through a resistor $R_{22}$ and a zenor diode $ZD_{21}$. The anode of the thyristor $SCR_{21}$ is connected to the output terminal of the rectifier 22 through the resistor $R_{24}$. The emitter of a phototransistor $PTR_{21}$ which senses the light of the photodiode $PD_{21}$ is connected in common to a gate of the thyristor $SCR_{22}$, a resistor $R_{25}$ a capacitor $C_{27}$, a connecting point between the resistors $R_{26}$ and $R_{27}$ which are connected in series to the power input terminal $V_{IN}$. The connecting point between resistors $R_{26}$ and $R_{27}$ is connected to an anode of the thyristor $SCR_{22}$ and to a collector of the phototransistor $PTR_{21}$. A base of the switching transistor $TR_{21}$ is connected to resistor $R_{27}$ and capacitor $C_{21}$.

The operation of the present invention will be explained below.

When direct current power is inputted to the power input terminal $V_{IN}$, the direct current power is applied to a primary coil $T_{21}$ of the transformer $T_2$ to induce a current in the secondary coils $T_{22}$, $T_{23}$ and $T_{24}$ in accordance with the ON and OFF switching of the transistor $TR_{21}$. The power induced in the secondary coil $T_{22}$ is applied to the base of the transistor $TR_{21}$ through the feedback circuit 21, thereby causing the ON and OFF switching of the transistor $TR_{21}$. The power induced in the secondary coils $T_{23}$ and $T_{24}$ are rectified via the rectifiers 22 and 23 and to produce the constant voltages $V_{21}$ and $V_{22}$.

When a rated voltage is outputted a zenor voltage of the zenor diode $ZD_{21}$ is established higher than the rated voltage to cause the zenor diode $ZD_{21}$ to turn OFF at this moment. Accordingly at this moment, the photodiode $PD_{21}$ is not lit, and the thyristor $SCR_{21}$ is OFF turned. Therefore, a rated voltage $V_{21}$ is normally outputted from the rectifier 22, and the phototransistor $PTR_{21}$ is turned OFF state in accordance with the lit off of the photodiode $PD_{21}$; therefore, the switching transistor $TR_{21}$ becomes to repeats the switching ON and OFF operations. If an overvoltage is outputted from the rectifier 23 and applied to the zenor diode $ZD_{21}$, the zenor diode $ZD_{21}$ becomes conductive. Therefore, a rated voltage $V_{22}$ outputted from the rectifier 23 is applied to the photodiode $PD_{21}$ and to a gate of the thyristor $SCR_{21}$ through the resistor $R_{22}$ and zenor diode $ZD_{21}$, thereby turning the photodiode $PD_{21}$ ON to produce light and causing the thyristor $SCR_{21}$ to become conductive.

Thus, when the thyristor $SCR_{21}$ becomes conductive, the constant voltage $V_{21}$ outputted from the rectifier 22 flows to earth through the resistor $R_{24}$ and the thyristor $SCR_{21}$.

Further, since the phototransistor $PTR_{21}$ is ON in response to the lighting of the photodiode $PD_{21}$, the power of the power input terminal $V_{IN}$ is applied to a gate of the thyristor $SCR_{22}$ through the resistor $R_{26}$ and phototransistor $PTR_{21}$. In accordance with this, the power applied to a base of the switching transistor $TR_{21}$ flows to the thyristor $SCR_{22}$ through a diode $D_{23}$; therefore, the switching transistor $TR_{21}$ is not operated in a switching operation and remains OFF.

Figure 3:
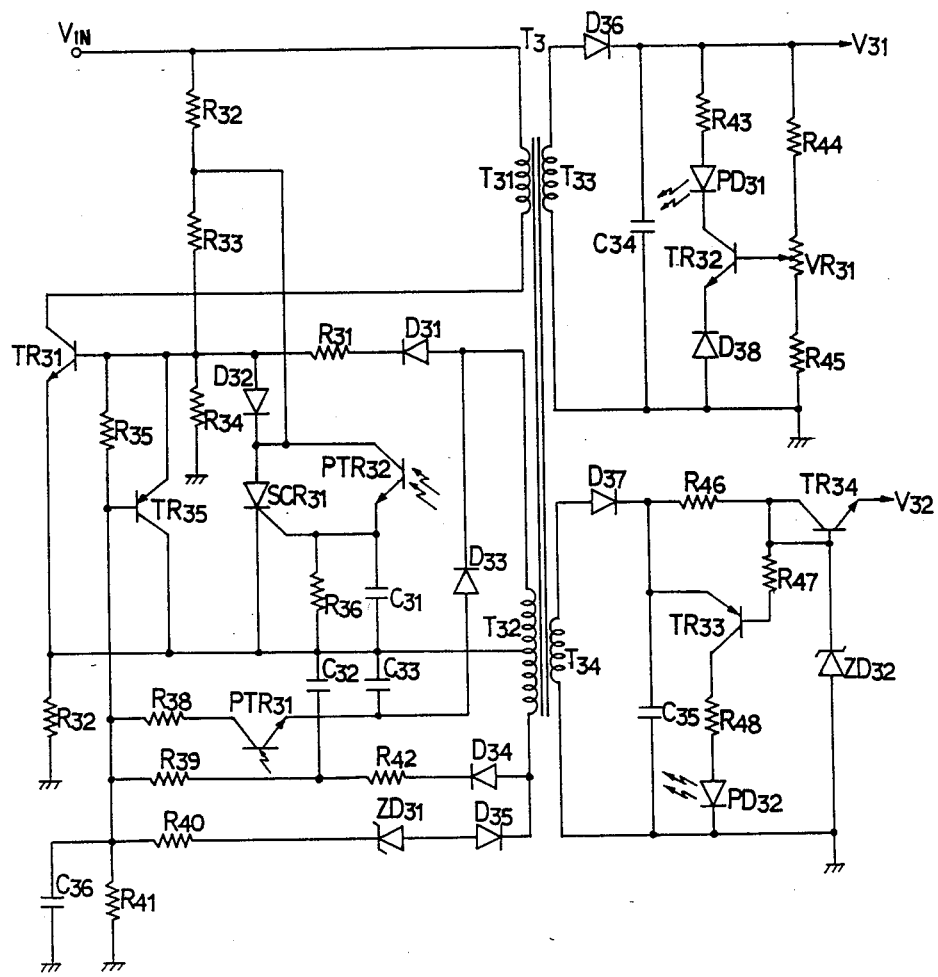
FIG. 3 is a circuit diagram of a protection circuit for a switching mode power supply circuit according to another embodiment of the present invention.

FIG. 3 is a circuit diagram showing the another embodiment of a protection circuit for switching power circuit according to the present invention. The protections circuit is constructed such that a connecting point between the resistor $R_{46}$ and a collector of the transistor $TR_{34}$ which outputs a second constant voltage $V_{32}$ is connected to a base of a transistor $TR_{33}$ through a resistor $R_{47}$. A collector of the transistor $TR_{33}$ is connected to the photodiode $PD_{32}$ through a resistor $R_{48}$. An emitter of the phototransistor $PTR_{32}$ which senses the light of the photodiode $PD_{32}$ is connected in common to a gate of the thyristor $SCR_{31}$, resistor $R_{36}$ and capacitor $C_{31}$. A connecting point of the resistors $R_{32}$ and $R_{33}$ which are connected in series to the power input terminal $V_{IN}$ is connected in common to an anode of the thyristor $SCR_{31}$ and to a collector of the phototransistor $PTR_{32}$. A base of the switching transistor $TR_{31}$ is connected in common to an anode of the thyristor $SCR_{31}$ and to a collector of the phototransistor $PTR_{32}$ at through a diode $D_{32}$.

The elements connected between a terminal end of secondary coil $T_{32}$ of the transformer $T_3$ and a base of the switching transistor $TR_{31}$ are formed with the usual feedback circuit. The resistors $R_{32}$, $R_{35}$, $R_{38}$ and $R_{41}$, capacitor $C_{36}$, transistor $TR_{35}$ and phototransistor $PTR_{31}$ are utilized to control the switching period of the switching transistor $TR_{31}$ by detecting the current. The resistor $R_{40}$, zener diode $ZD_{31}$ and diode $D_{35}$ are utilized to control the primary side input voltage variation. The resistors $R_{39}$ and $R_{42}$, capacitor $C_{32}$ and diode $D_{34}$ are utilized to protect the power supply source and secondary load from an overcurrent state.

The operation of the above embodiment according to the present invention will be explained in detail below.

When an over current is present such that a load which is supplied with second constant voltage $V_{32}$ is short circuited or the like, a voltage drop at the resistor $R_{45}$ becomes larger and a lower potential is applied to a base of the transistor $TR_{33}$. Therefore, the transistor $TR_{33}$ becomes conductive, and accordingly, the photodiode $PD_{32}$ becomes lit. Since the phototransistor $PTR_{32}$ which senses the light of the photodiode $PD_{32}$ the power of the power input terminal $V_{IN}$ is applied to a gate of the thyristor $SCR_{31}$ through the resistor $R_{32}$ and phototransistor $PTR_{32}$. The thyristor $SCR_{31}$ is then turned ON. The power applied to a base of the switching transistor $TR_{31}$ flows through the diode $D_{32}$ and thyristor $SCR_{31}$; therefore the switching operator of the transistor $TR_{31}$ is not executed.

As explained in detail above the present invention presents the power from being unnecessarily lost because the switching operation of the switching transistor is interrupted by detecting when an overvoltage is outputted.

What is claimed is:

1. A protection circuit for a switching mode power supply circuit which a voltage from a voltage input terminal is induced in first and second secondary coils of a transformer and a voltage is induced in a third secondary coil of the transformer for controlling ON/OFF switching of a switching transistor through a feedback circuit, the voltage induced in the first and second secondary coils being rectified by first and second rectifiers and outputted with first and second constant voltages, comprising:
  a photodiode being connected to the second rectifier through a zener diode,
  a first thyristor having an anode connected to the first rectifier;

a phototransistor which senses light produced by said photodiode;

a capacitor being connected to said phototransistor; and a second thyristor being connected to said phototransistor;

being connected to the power input terminal;

said thyristor being connected to the power input terminal;

said switching transistor being connected to the power input terminal through a diode; wherein said ON.OFF switching operation of said switching transistor is interrupted when an overvoltage is outputted from said second rectifier, said overvoltage being a voltage higher than a zener voltage of said zener diode.

2. A protection circuit for a switching mode power supply circuit which a voltage from a voltage input terminal is induced in first and second secondary coils of a transformer and a voltage is induced in a third secondary coil of the transformer for controlling ON-/OFF switching of a switching transistor through a feedback circuit, the induced voltage in the first and second secondary coils being rectified by first and second rectifiers and outputted with first and second constant voltages, comprising:

a first photodiode being connected to the second rectifier through a first transistor;

a first zener diode being connected in parallel with said first photodiode and said first transistor through a first resistor;

a second transistor being connected to the first rectifier through a second photodiode;

a first phototransistor which senses light produced by said first photodiode;

a capacitor being connected to said first phototransistor;

a thyristor being connected to said first phototransistor;

a second phototransistor being which senses light produces by said second photodiode; and a second zener diode being connected in parallel with said second phototransistor;

said first and second phototransistors being connected to said switching transistor through a first and second diode, respectively;

said first phototransistor and said thyristor being connected to the power input terminal;

said ON/OFF switching operation of said switching transistor being interrupted when an overcurrent is detected by said first transistor and said first zener diode;

said overcurrent causing said first transistor to turn on, thereby causing said first photodiode to illuminate.

* * * * *